United States Patent

Karlsson

[11] Patent Number: 5,255,654
[45] Date of Patent: Oct. 26, 1993

[54] DEVICE TO REDUCE GAS EXCHANGE LOSSES OF AN INTERNAL COMBUSTION ENGINE

[75] Inventor: Jan Karlsson, Västra Frölunda, Sweden

[73] Assignee: AB Volvo, Goteborg, Sweden

[21] Appl. No.: 844,645

[22] PCT Filed: Oct. 2, 1990

[86] PCT No.: PCT/SE90/00634

§ 371 Date: Apr. 1, 1992

§ 102(e) Date: Apr. 1, 1992

[87] PCT Pub. No.: WO91/05152

PCT Pub. Date: Apr. 18, 1991

[30] Foreign Application Priority Data

Oct. 2, 1989 [SE] Sweden ............... 8903220-5

[51] Int. Cl.$^5$ ............................................. F02D 9/08
[52] U.S. Cl. ................................. 123/403; 123/337
[58] Field of Search ............... 123/403, 337, 564; 60/274

[56] References Cited

U.S. PATENT DOCUMENTS

| | | | |
|---|---|---|---|
| 3,935,842 | 2/1976 | Ishizawa et al. | 123/403 |
| 4,158,352 | 6/1979 | Blatter | 123/403 |
| 4,228,772 | 10/1980 | Bakonyi | 123/403 |
| 4,254,747 | 3/1981 | Sumiyoshi et al. | 123/403 |
| 4,426,985 | 1/1984 | Kawasaka | 123/564 |
| 4,452,203 | 6/1984 | Oshika et al. | 123/403 |
| 4,467,601 | 8/1984 | Watanabe | 123/403 |
| 4,471,611 | 9/1984 | Watanabe | 60/274 |
| 4,519,369 | 5/1985 | Kitamura | 123/337 |
| 5,080,065 | 1/1992 | Nomura et al. | 123/403 |

Primary Examiner—Raymond A. Nelli
Attorney, Agent, or Firm—Merchant & Gould, Smith, Edell, Welter & Schmidt

[57] ABSTRACT

This is a device for reducing gas exchange or pumping losses of an internal combustion engine having a throttle (1) for controlling the pressure in the inlet manifold for the combustion air with or without fuel to the cylinders of the motor. In the inlet manifold (20) to every cylinder there is provided a separate (1) throttle whereby the low pressure side of the inlet manifold relative to the throttle is supplied air or fuel-air mixture of higher pressure than the pressure of the low pressure side by a valve which at the start of every inlet stroke is kept open and which closes before the inlet valve of the engine closes with the closing function of the valve is actuated by the position of said throttle.

10 Claims, 7 Drawing Sheets

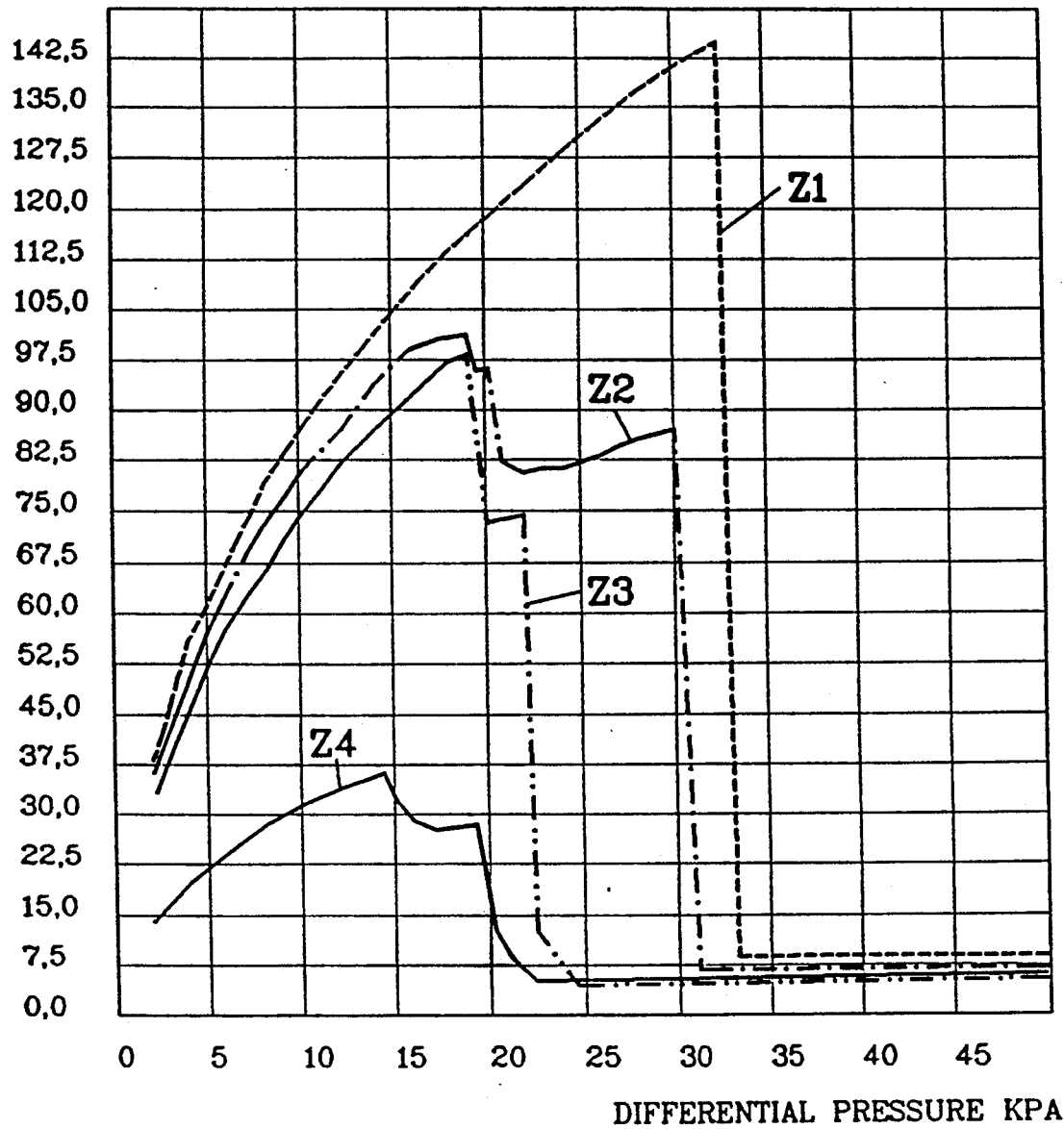

DEVICE TO REDUCE GAS EXCHANGE LOSSES OF AN INTERNAL COMBUSTION ENGINE

TECHNICAL FIELD

The present invention refers to a device for reducing gas exchange losses or pumping losses of an internal combustion engine comprising a throttle for controlling the pressure in the inlet manifold for the combustion air with or without fuel to the cylinders of the engine.

BACKGROUND OF THE INVENTION

Much has been done to reduce the fuel consumption of internal combustion engines. This generally can be achieved by making the combustion, that is the release of energy as efficient as possible. The design of the combustion chamber and the composition of gas is of great importance. Also, by reducing the internal losses in the form of flow and friction losses of the engine the efficiency can be substantially raised.

Flow losses in the form of gas exchange or pumping losses arise when combustion gases are going to be replaced by the engine by a new working medium after the working stroke. These losses are particularly obvious when the engine is controlled by a throttle and is operating in the low load and partial load range. The car engines of today are very much oversized to offer relaxed and restful driving with a large power in reserve for rapid acceleration. This implies that driving in the city and on the main, with other words the most common driving conditions, the engines are operating with large pumping losses.

At inlet of fresh gases to the cylinder of an internal combustion engine there is pressure drop because of the flow in the ducts and at the valves and the throttle. These pressure drops gives rise to a negative pressure in the inlet system. In the same way at exhaust of exhaust gases there is a positive pressure in the exhaust system because of the flow resistance. This pressure difference is the reason for work to be consumed to pump the gases into and out of the cylinders and this is called gas exchange work or pumping losses.

In the pV- diagram, see FIG. 1, the area between the inlet line and the exhaust line the pumping work. In the logarithmic pV-diagram, FIG. 1a, the pumping cycle is brought about and therefore this is used hereinafter. To compare, the real proportions are seen in the linear diagram, FIG. 1b.

The power of the auto engine is controlled by varying the inlet gas mass. Since the inlet volume all the time is constant, and equal to the cylinder volume of the engine, the density of the gas has to be varied. This is achieved by the gas being choked by a butterfly valve or a throttle. The control method per se thus implies that the pressure of the inlet gas has to be reduced in order to reduce the power. At full load the throttle is fully open and in that case very small pressure losses are obtained at the inlet. At low load however there is a very small throttle opening which gives a very great pressure loss because of the choking. Through the throttle control the engine thus has to work with a lower pressure than atmospheric pressure on the inlet side. When the piston is taking in air at a lower pressure a larger amount of work is consumed. The lower load on the engine the lower is the inlet pressure which makes the pumping losses increase. From FIG. 2 can be seen that the pumping losses increase considerably at low load. A comparison at constant speed shows that the pumping losses at full load may be about 5% of indicated power while they are about 50% at low load.

The engines of passenger cars of today are driven during the major part of the time at very low load, at the magnitude of 20% of the maximum power. At normal driving thus a very little throttle opening is used, which results in the pumping losses being largest in the operational range in which passenger cars are most often driven.

The method according to which the pumping losses are going to be reduced according to the present invention can be derived from the equation of state:

$$pV = mRT \text{ implies } p = mRT/V \quad (1)$$

Here we let p be the inlet pressure in an arbitrary position of the inlet stroke The rest of the parameters are:
  m = mass (air-fuel mixture)
  R = gas constant
  T = temperature of the mixture
  V = sA + Vc = volume
  s = stroke
  A = piston area
  Vc = compression volume All efforts to reduce the pumping losses at low load aim to increase p. Without affecting the maximum power of the motor from eq. (1) it can be achieved:
* A decrease of V
* An increase of m
* An increase of T At low load the volume can be reduced by in some way reducing the stroke: either the geometric or the effective intake stroke. With the effective intake stroke is here meant the part of the stroke when intake occurs. Moreover the volume can be reduced by disengaging a number of cylinders of multiple cylinders at low load.

Methods in known technique which apply reducing of the effective intake stroke are available in two variants namely:

Early closing of the intake valve, EIVC (Early Intake Valve Closing), and late closing of the intake valve, LIVC (Late Valve Intake Closing). Devices according to these methods controls the engine power by continuously varying the closing time and lift of the intake valve.

With EIVC is meant that intake valve closes before lower dead point. In certain designs there is no throttle at all. A degree value after the designation of the control method states the time for valve closing in reference to the lower dead point.

E.g. EIVC 60: The valve closes 60 degrees before the lower dead point.

At load control using EIVC the intake valve opens as in a conventional engine just before the intake stroke. As the cylinder volume increases during the intake stroke the fuel-air mixture is let in at nearly atmospherical pressure, since no choking butterfly valve is present.

Thereafter the power is controlled by closing the valve when a sufficient amount of mass has flowed in. With other words the power is controlled by the time for valve closing. After the closing the gas expands simultaneously as the piston completes the intake stroke. Thereafter compression, expansion and exhaust follows as in a conventional engine.

STATE OF THE ART

The technical solutions by which EIVC and LIVC are achieved are relatively complicated.

In FIG. 3 is shown a mechanical system according to Porsche with two cam shafts which can be displaced in phase with respect to each other and gives EIVC. One cam shaft operates as a conventional cam shaft and handles the lift. The other decides for how long time the valve should be open. In FIG. 4 is shown a system according to Volkswagen, where the conventional valve system is maintained. A rotating slide valve instead has been placed in front of the usual inlet valve. By coupling the rotating slide valve to the cam shaft and make it phase displaceable with respect to said shaft an early valve closing is accomplished, EIVC.

In FIG. 5 is shown an alternative method to control the valves, by which the valve system is provided with controllable hydraulic valve lifters and in such a way that both EIVC and LIVC are accomplished.

In the U.S. patent specification 4 158 352 is described a method and apparatus for introducing additional air into the intake manifold to aid in the starting of an internal combustion engine. A flapper valve is provided on the throttle valve which is operative according to the pressure differential across the flapper valve blade. Said throttle blade is preformed to be in an open position when the engine is cranked prior to starting. When the engine starts, the manifold pressure will rapidly drop and the large pressure differential across the flapper will close the hole and normal idle vapor flow will occur.

The device according to this patent 4,158,352 is not intended to give EIVC-function and neither can give such a function, particularly in the case it was mounted on a single cylinder engine since the sensitivity of the flapper valve for the mass flow is not actuateable in the same way as in the device according to the invention, in which is used a stop lug which is movable by a mechanical coupling to the throttle control and gives different stroke of the valve (corresponds to the flapper opening x in the U.S. patent specification). At increased throttle opening the EIVC-function is gradually shut off since the stop lug forces the valve to closing.

THE OBJECT OF THE INVENTION

The object with the present invention is to accomplish the EIVC function by means of an uncomplicated device at the inlet part of the engine whereby the drawbacks in above related technique are substantially eliminated.

The problem related above which forms the basis of the invention is solved by means of a device according to the accompanying patent claims.

DESCRIPTION OF THE DRAWINGS

With reference to the accompanying drawing in the following preferred embodiments of the present invention will be described.

In the drawing

FIG. 9 shows a diagram of the operation of a valve according to the invention from which can be seen mass flow of the gas as a function of differential pressure over the valve;

DESCRIPTION OF EMBODIMENTS

Figure 1A:
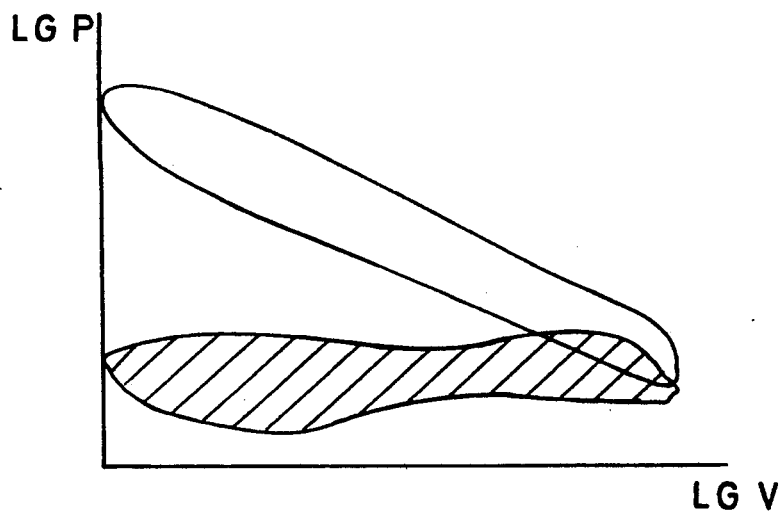
FIGS. 1A and 1B show a pV - diagram of an Otto engine in which the present invention is used.
Figure 1B:
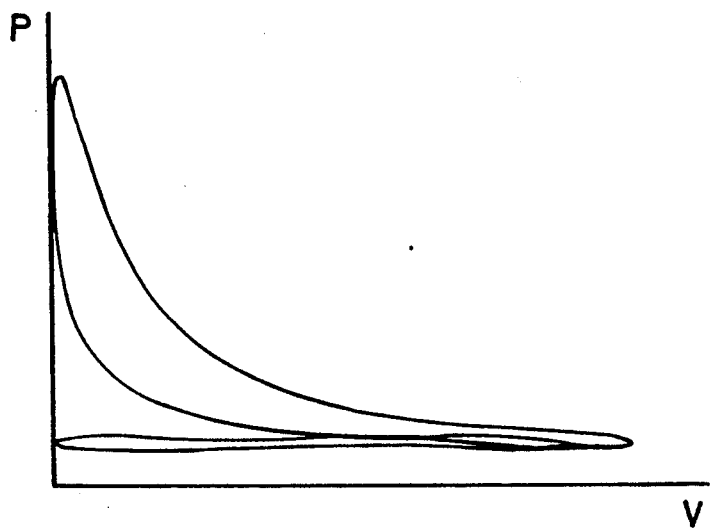
Figure 2:
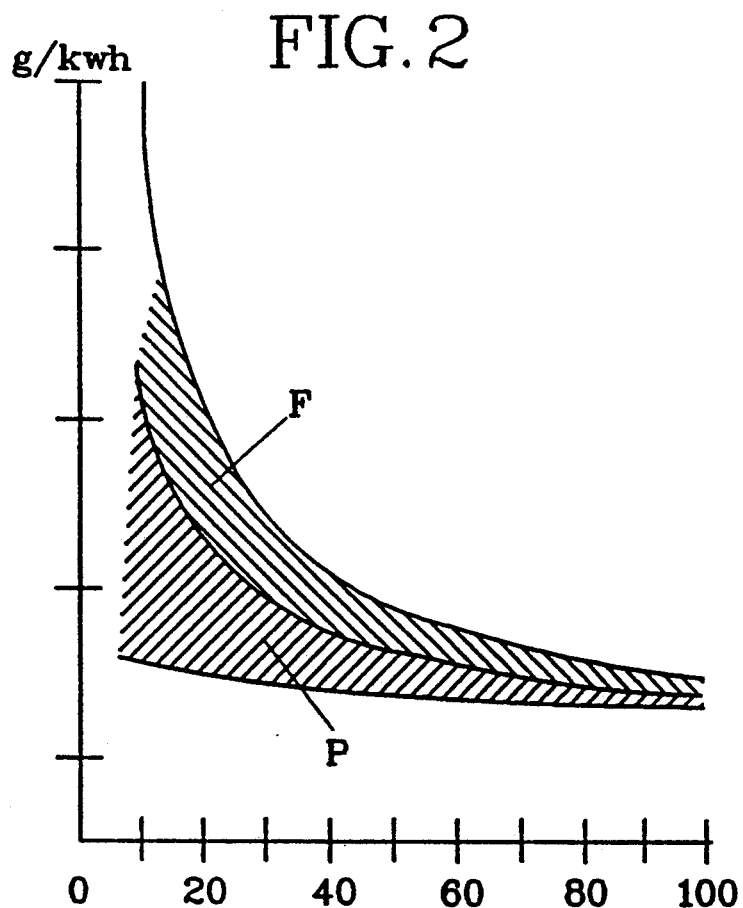
FIG. 2 shows a diagram of specific fuel consumption g/kwh as a function of share of output power in percent, F=friction losses, P=pumping losses.
Figure 10:
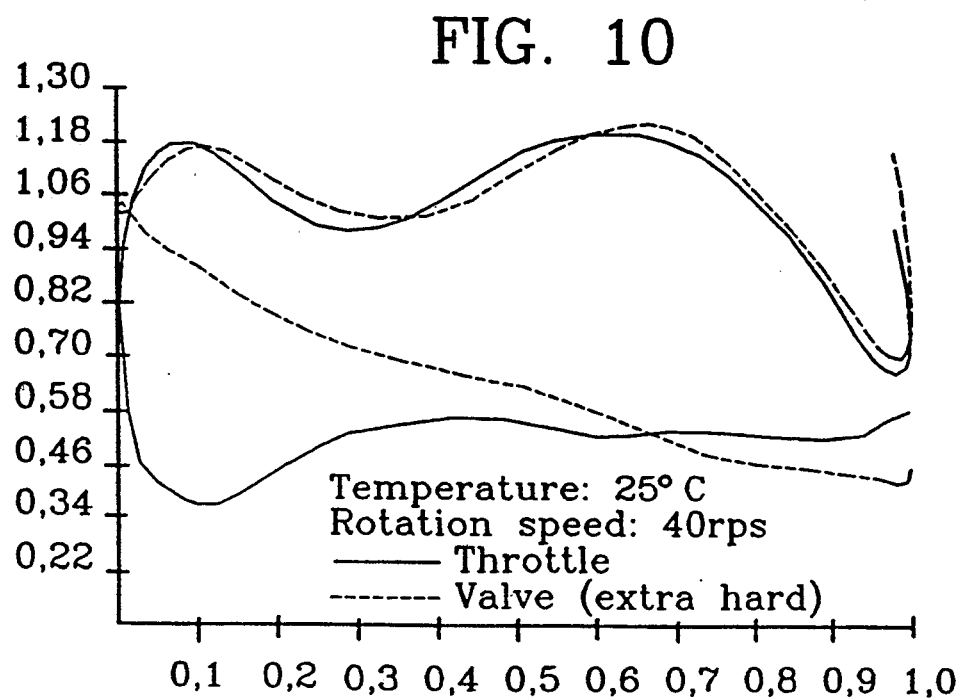
FIG. 10 shows a pressure- volume diagram in which is incorporated partly a normal throttle (solid line) and partly a valve according to the invention (dashed line).
Figure 3:
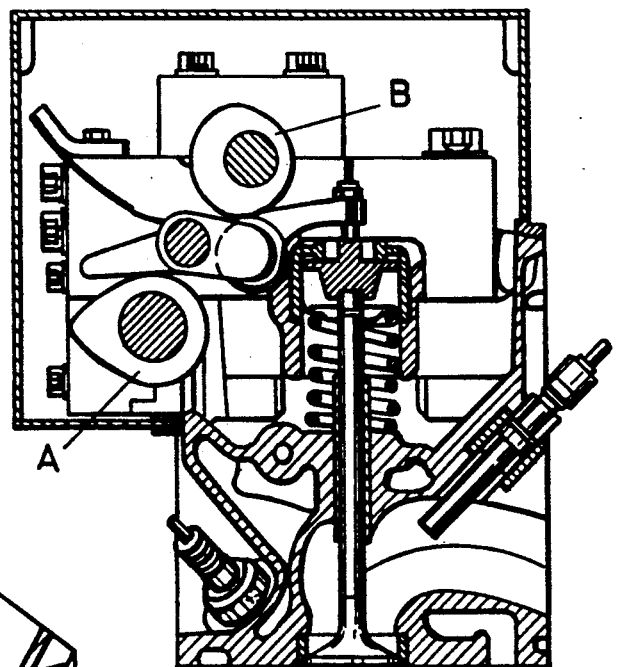
FIG. 3-5 shows the state of art related to devices to achieve EIVC.
Figure 4:
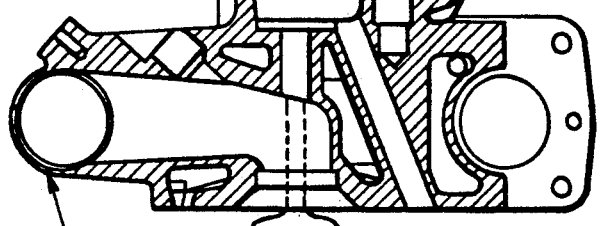
Figure 5:
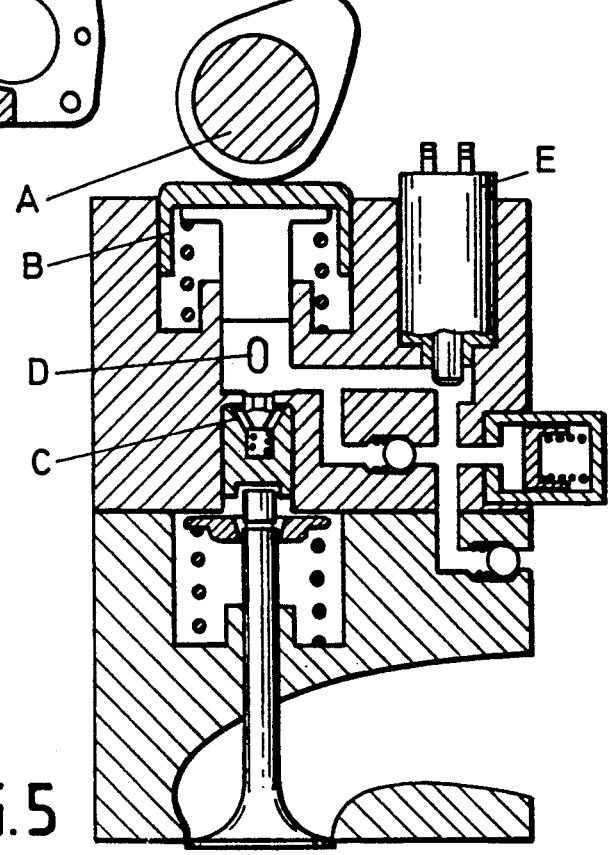
Figure 6:
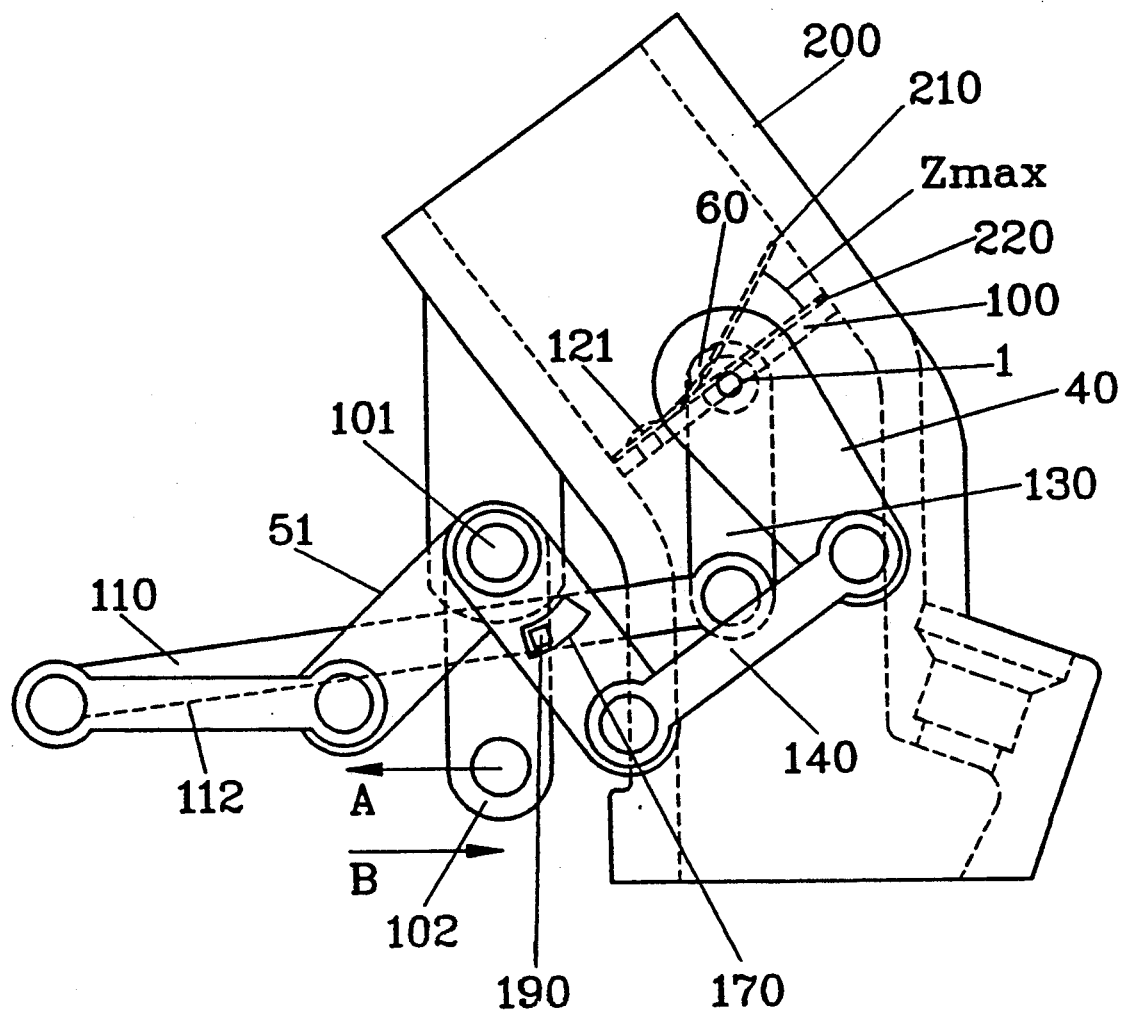
FIG. 6 shows a lateral view of an inlet manifold in which a first embodiment of the invention is contained.
Figure 7:
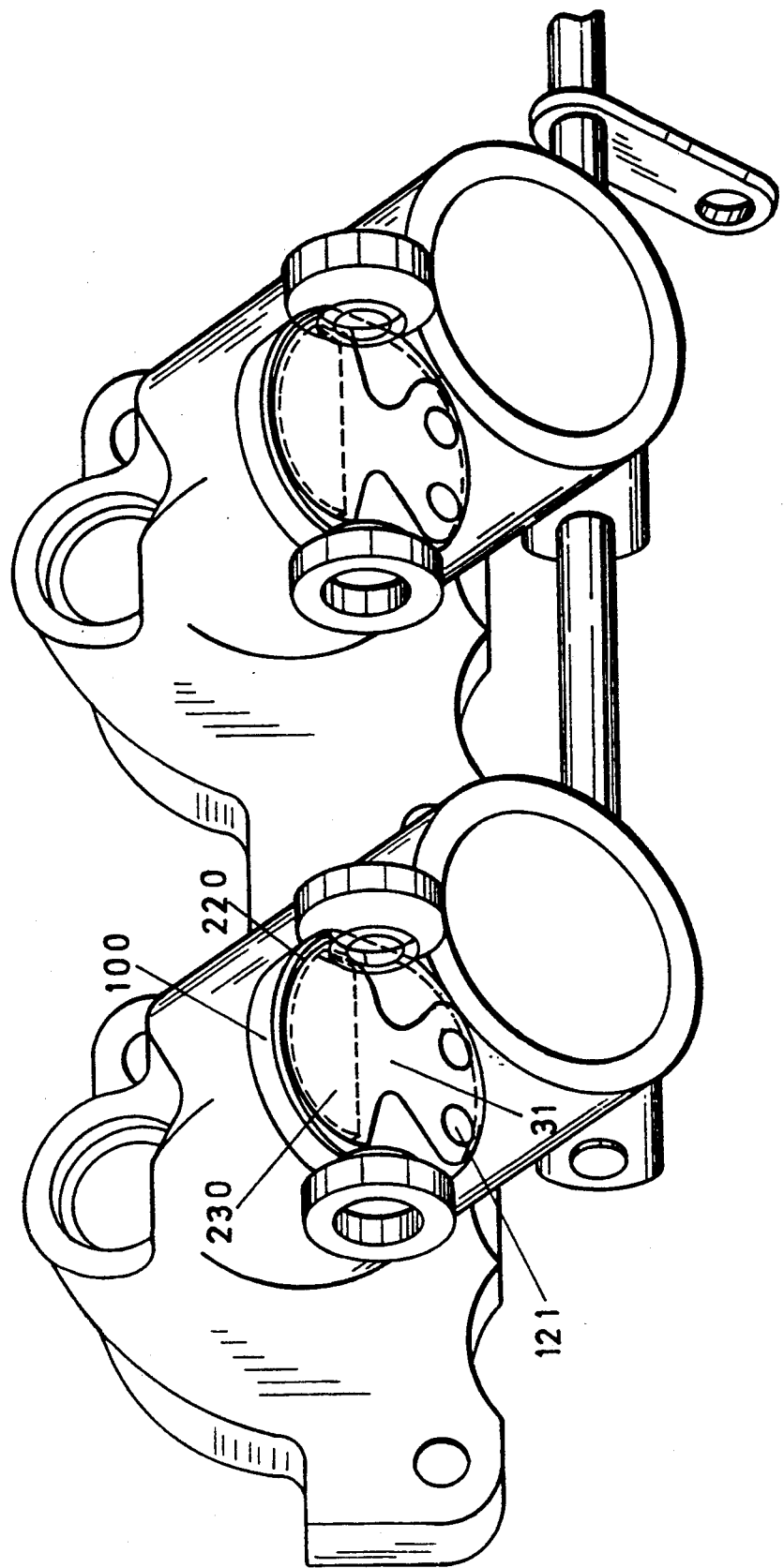
FIG. 7 shows an X-ray view of a system of throttles comprising the first embodiment of the invention.

With reference to FIG. 6 is shown a section of an inlet manifold 200 comprising a throttle 1 on which has been provided a leaf formed valve flap 210 which is resiliently mounted by means of the cut-in resilient portion 31 with a mounting point in the throttle disc 100 by means of the rivets 121. In the throttle disc there is an opening 230, the rim of which forms a valve seat 220 for the valve flap 210. The throttle is operated by means of a first arm 40 to which is coupled a link 140. In the resting position the valve flap 210 is separated from the valve seat 220 on the throttle disc 100 by means of a prebending in the portion 31.

The presetting of the valve flap 210 with reference to the valve seat 220 is carried out by means of setting heel 60 which is provided on a tube shaft which is concentric with the shaft supporting the throttle disc 100. The throttle is operated by means of a lever 102 which is coupled to a distributor arm 51 by the way of a driver 190 and provided with bearings at the inlet manifold at the central axis 101. The arm actuates partly the lever 40 of the throttle and partly the lever of the valve 130 by way of links 140 and 112, 110 respectively. In the distributing arm 51 one of the branches is provided a sector formed slot in which runs the driver 190. The sector formed slot is designed with such an angle opening, that the valve 210, 220 opens completely before the throttle opens.

The function of the valve 210,220 according to the present invention is the following:

In FIG. 6 the throttle is shown closed and the valve 210, 220 is completely open. At the beginning of the inlet stroke the valve is kept open by the valve spring 31 and allows a certain volume gas mixture to flow into the cylinder. Because of the flow a certain pressure difference arises over the valve flap and when this pressure difference overcomes the spring force the valve 210,220 closes. This closing occurs before the intake valve of the engine closes and thereby gives EIVC - function.

With reference to FIG. 9 mass flow as a function of different pressure at different settings of the heel 60 is illustrated, the displacement of which gives different distances z between the valve flap 210 and the valve seat 220. In the figure the closing function at four different settings $z_1$-$z_4$ in linear steps of $\delta z$ that is $z_2 = z_1 - \delta z$; $z_3 = z_1 - 2\delta z$; $z_4 = z_1 - 3\delta z$.

Figure 8:
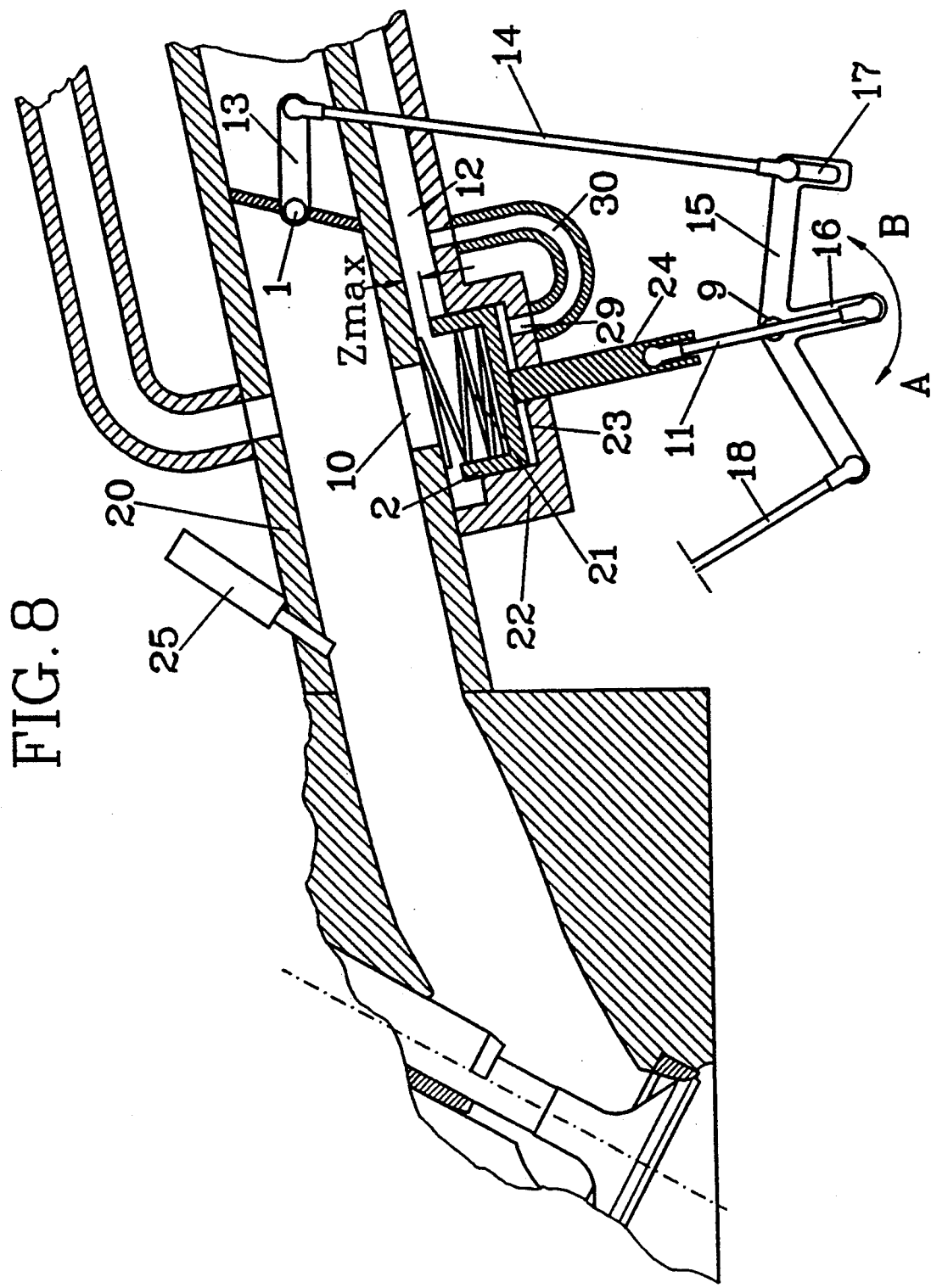
FIG. 8 shows a central sectional of a manifold in which a second embodiment of the invention is contained.

In FIG. 6 as well as in FIG. 8 the maximum distance or the stroke $z = z_{max}$ for respective valves is shown. Extreme positions for the throttle of the system in FIG. 6 thus are: A = fully open throttle which gives a completely closed valve 210, 220 ($Z=0$) and B= completely closed throttle and completely closed valve 210, 220 ($z=0$). The positions A and B does not give EIVC.

With reference to FIG. 8 in a second embodiment of the valve according to the invention shown a central section of the inlet manifold 20 of an injection engine comprising the injection nozzle 25 and a throttle 1. On the low pressure side a partial load air duct 12 enters which supplies the cylinder of the engine a preheated gas mixture e.g. air from the atmosphere by an air filter, at higher pressure than that of the low pressure side by a circular opening 10. A cylindrical house 22 is provided against the opening 10 in which house a piston 2 slides, which piston is open at one end and receives a valve spring 21 which forces the piston 2 against the bottom part 23 of the house 22. At the closed end of the piston is fixed an operating rod 24 at the free end of which is provided a groove which admits movement of the piston 2 towards the tube 20 whereby the angle position of the link 11 determines the stroke of the piston 2. The link 11 by way of the lever system 16, 15 is mechanically connected to the throttle wire 18. Extreme positions for the throttle of the system in i FIG. 8 are:

A= completely open throttle which gives closed valve 2, 20 (z=0) and

B= closed throttle and completely closed valve 2,20 (z=0). The positions A and B does not give EIVC.

Through the bottom portion 23 there is a hole against which is connected a bypass duct 30 from the partial load air duct 12. The throttle is connected to the throttle wire by way of the lever 13, the link 14 and the lever 15.

In the branch of the lever 15 which is connected to the lever 13 is provided a slot 17 which lets the throttle be closed until the valve 2, 20 has been opened completely with a movement of the throttle control from the extreme position B. FIG. 8 shows a completely open valve ($z_{max}$) and closed throttle 1.

In the same way as in the first embodiment above we consider a separate inlet stroke. At the beginning of the inlet stroke the valve 2, 20 is kept open by the valve spring 21 and allows a certain volume to flow into the cylinder by the partial load duct 12 through the inlet valve. Because of the flow a certain pressure difference arises over the piston 2 and when this pressure difference overcomes the spring force the valve 2, 20 closes before the inlet valve of the engine and thereby gives EIVC - function.

In the extreme position A the throttle is completely open and the valve 2,20 completely closed by influence of the movement of the arm 16 and the link 11. During this position the valve is closed during the complete inlet stroke and there by the EIVC- function is disconnected. In a third embodiment of the invention, the second embodiment is completed with an exhaust turbine driven compressor which feeds the partial load air duct 12, whereby through this embodiment a more favorable pressure and temperature process is obtained during the inlet and compression phase.

I claim:

1. A device for reducing pumping losses in an internal combustion engine comprising a throttle for controlling the combustion air pressure in the inlet manifold prior to said combustion air reaching the cylinders, characterized wherein the inlet manifold to every cylinder is provided with a separate throttle structure whereby the low-pressure side of the inlet manifold, relative to said throttle, is supplied with one of an air, or air-fuel mixture of higher pressure than said low-pressure side of said inlet manifold, by an inlet valve which is kept open at the start of every inlet stroke but which closes prior to the closing the said closing of the said inlet valve is controlled by the position of said throttle structure.

2. Device according to claim 1 wherein that said inlet valve comprises a valve body, valve spring and valve seat whereby the valve body is arranged clamped by means of the valve spring against a settable stop which is actuated by the position of the throttle so that the valve body takes a certain distance from the valve seat at the beginning of the inlet stroke and obtains a closing function when the gas flow increases and gives a difference surface pressure on said valve body in inverse proportion to said distance set by means of said stop between said valve body and valve seat which difference surface pressure acts against the force caused by the valve spring.

3. Device according to claim 1 characterized therein, that said inlet valve is arranged on the throttle and wherein said valve is capable of full closure.

4. Device according to claim 1, wherein that said valve is provided with an opening towards the low pressure side of the manifold and air supply takes place by a partial load air duct.

5. Device according to claim 1, characterized therein, that said inlet valve body is formed as a flap which seals against an opening in the throttle disc whereby the flap is kept against the stop by a prebending of a resilient portion which stop determines the opening (z) of the valve flap.

6. Device according to claim 2 wherein said inlet valve body is formed as a cylindric piston open at one end, which piston is slidable in a house on said partial load air duct, the open end of the cylinder seals in its end position against a valve seat on the inlet manifold and receives a valve spring, which keeps the piston against the link which determines the stroke of the piston.

7. Device according to claim 6 wherein the through flow area of said valve in the rest position is influenced by the throttle control by way of mechanical link systems so that by choked throttle an increase of the throttle only increases the through flow area of said valve to a maximum ($Z_{max}$) and at further opening of the throttle gradually reduce the through flow area to closed valve at full throttle opening.

8. Device according to claim 1, wherein an injection nozzle (25) for fuel is placed downstream of the throttle (1).

9. Device according to claim 1 wherein an injection nozzle (25) for fuel is placed upstream of the throttle (1).

10. Device according to claim 4 wherein that said partial load air duct is fed by air from a compressor driven by an exhaust turbine.

* * * * *